United States Patent [19]

Taue et al.

[11] Patent Number: 5,072,882
[45] Date of Patent: Dec. 17, 1991

[54] HIGH PRESSURE FUEL INJECTION DEVICE FOR ENGINE

[75] Inventors: Jun Taue; Takeo Yoshida, both of Iwata, Japan

[73] Assignee: Yamaha Hatsudoki Kabushiki Kaisha, Yamaha Motor Co., Ltd., Iwata, Japan

[21] Appl. No.: 573,844

[22] Filed: Aug. 28, 1990

Related U.S. Application Data

[62] Division of Ser. No. 318,674, Mar. 3, 1989, Pat. No. 4,993,636.

[30] Foreign Application Priority Data

Mar. 4, 1988 [JP] Japan .................................. 63-50955
Mar. 4, 1988 [JP] Japan .................................. 63-50958

[51] Int. Cl.$^5$ ............................................. F02M 51/00
[52] U.S. Cl. ........................................ 239/88; 239/124
[58] Field of Search ................................. 239/88–96, 239/124, 126, 533.3, 533.4, 533.12, 585

[56] References Cited

U.S. PATENT DOCUMENTS

| 3,680,782 | 8/1972 | Monpetit et al. | 239/96 |
| 4,215,820 | 8/1980 | Renger | 239/90 |
| 4,258,883 | 3/1981 | Hofmann et al. | 239/124 |
| 4,899,935 | 2/1990 | Yoshida et al. | 239/41 |
| 4,964,571 | 10/1990 | Taue et al. | 239/585 |
| 5,004,154 | 4/1991 | Yoshida et al. | 239/124 |

Primary Examiner—Andres Kashnikow
Assistant Examiner—Kevin Weldon
Attorney, Agent, or Firm—E. A. Beutler

[57] ABSTRACT

An accumulator type fuel injection nozzle having a relief valve for the control chamber that is controlled by an electromagnet constructed in such a way so as to reduce flux losses to the outer housing of the injection nozzle. In addition, the inlet and return ports of the nozzle are formed in the outer end of the nozzle and extend axially so that the mounting position of the nozzle will not be critical to the fuel connections to the pump and return lines.

4 Claims, 2 Drawing Sheets

HIGH PRESSURE FUEL INJECTION DEVICE FOR ENGINE

This is a division of U.S. patent application Ser. No. 318,674, filed Mar. 3, 1989 now issued as U.S. Pat. No. 4,993,636 on Feb. 19, 1991.

BACKGROUND OF THE INVENTION

This invention relates to a high pressure fuel injection device for an engine and more particularly to an improved electromagnet assembly and general overall configuration for such a fuel injection device.

One popular form of fuel injection device for engines is the so-called "accumulator type". This type of injection nozzle includes an accumulator chamber that is charged with fuel under pressure and which communicates with a nozzle port. An injection valve is supported within the accumulator chamber and controls the discharge through the nozzle port. An actuating device is associated with the injection valve and is moveable within a control chamber that is also pressurized with fuel. A relief valve is associated with the control chamber and is opened so as to reduce the pressure and cause the pressure in the accumulator chamber to unseat the injection valve and initiate fuel injection.

Normally the relief valve is operated by an electromagnet assembly that is contained within the housing of the fuel injection nozzle. Although this type of injection system is quite effective, the positioning of the electromagnet within the housing can give rise to stray flux paths which will adversely effect the operation of the device and its responsiveness. For example, when the supporting yoke of the electromagnet is disposed adjacent and in close contact with the outer housing, this stray flux path can significantly reduce the responsiveness of the relief valve and, accordingly, the operation of the system.

It is, therefore, a principal object of this invention to provide and improved electromagnet assembly for this type of fuel injection nozzle.

It is a further object of this invention to provide an electromagnet assembly for a fuel injection nozzle wherein stray flux paths are substantially eliminated.

With the type of injection nozzle described, it is, of course, necessary to provide a supply conduit for supplying the pressurized fuel to both the accumulator chamber and the control chamber. In addition, a return line must also be incorporated so as to provide a path for return flow of fuel from the control chamber back to the fuel tank. With conventional types of injection nozzles, these passages or at least one of them have been disposed at an angular relationship to the nozzle housing. As a result, when the nozzle is screwed in place into the engine, the passages may not be appropriately located and, accordingly, shimming or adjustment is required.

It is, therefore, a further object of this invention to provide an improved nozzle assembly for a fuel injection system wherein the fuel supply and return ports are located in such a position that the angular position of the nozzle in the engine will not present a problem.

SUMMARY OF THE INVENTION

This invention is adapted to be embodied in an accumulator type injection nozzle that is comprised of an accumulator chamber that is adapted to be supplied with high pressure fuel. A nozzle port leads from the accumulator chamber and an injection valve is moveable between a closed position and an open position for controlling the discharge of fuel from the accumulator chamber through the nozzle port. A control chamber is also incorporated that receives pressurized fuel and a control member is supported for movement within the control chamber and is associated with the injector valve for retaining the injector valve in its closed position when the control chamber is pressurized and for movement of the injector valve to its open position when pressure is relieved in the control chamber. A relief valve means is moveable between a closed position for maintaining pressure in the control chamber and an opened position for relieving pressure in the control chamber for effecting fuel discharge through the nozzle port.

In accordance with one feature of the invention, the nozzle is comprised of an outer housing that defines a chamber within which an electromagnet is positioned for moving the relief valve to one of its positions when the electromagnet is energized. The electromagnet is comprised of an armature surrounded by a winding and a yoke that supports the winding and which yoke has an intermediate portion in proximity to one end of the winding and extending inwardly toward the armature. The yoke has a first portion that is spaced from the outer housing inwardly of the cavity and a mounting portion that is fixed relative to the outer housing and which is connected to the intermediate portion by means for reducing flux leakage to the outer housing.

In accordance with another feature of the invention, the nozzle has an outer housing and a threaded portion for threadingly supporting the outer housing in the associated engine. There is provided a fuel inlet port for supplying fuel to the accumulator chamber and control chamber and a return port for returning fuel from the control chamber to the fuel system. In accordance with this feature of the invention, at least one of these ports extends axially of the outer housing and through its outer end.

DETAILED DESCRIPTION OF THE PREFERRED EMBODIMENT OF THE INVENTION

Figure 1:
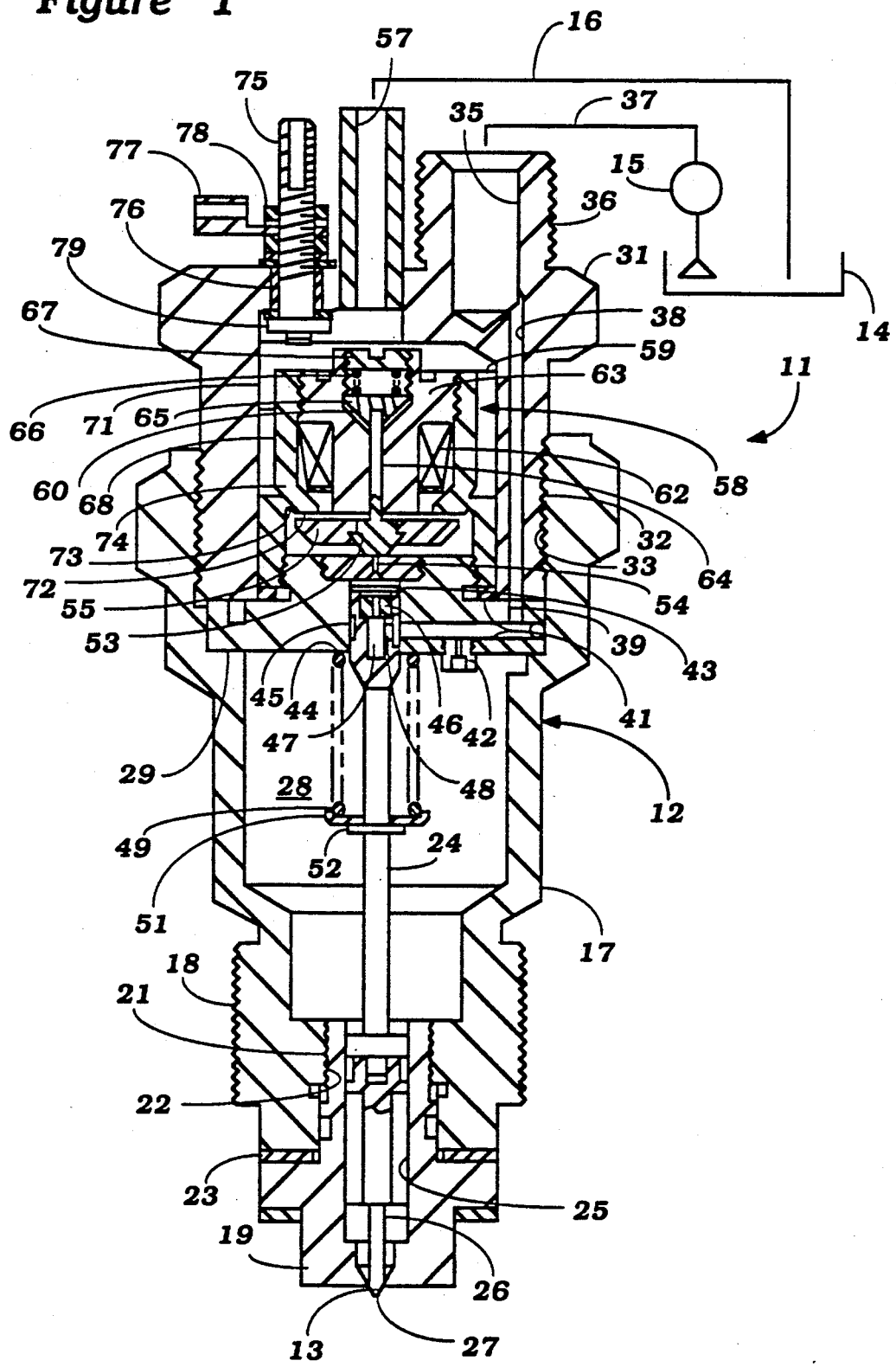
FIG. 1 is a cross-sectional view of a fuel injection nozzle constructed in accordance with an embodiment of the invention and shown in a fuel system which is depicted schematically.
Figure 2:
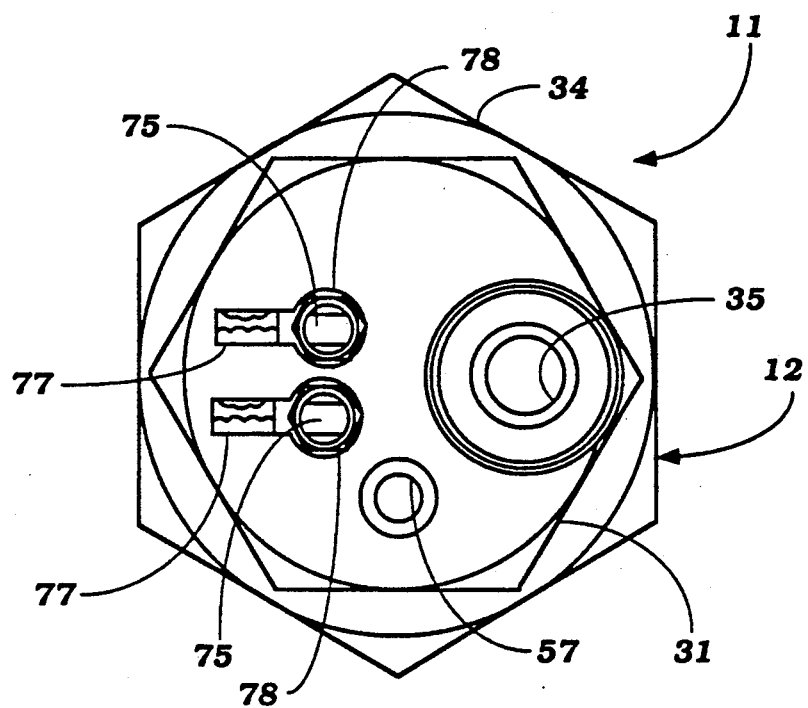
FIG. 2 is a top plan view of the fuel injection nozzle.

Referring to the drawings, a fuel injection nozzle constructed in accordance with an embodiment of the invention is identified generally by the reference numeral 11. The injection nozzle 11 is comprised of an outer housing assembly, indicated generally by the reference numeral 12 that is adapted to be mounted, in a manner to be described, in the cylinder head of an internal combustion engine with a nozzle port 13 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

Fuel is supplied to the injection nozzle 11 from a remotely positioned fuel tank 14 by means of a high pressure pump 15. Excess fuel is returned back to the reservoir 14 through a return line 16. The fuel delivery and return systems per se form no part of the invention and, for that reason, they have been illustrated only schematically.

The outer housing 12 is comprised of a lower piece 17 that has a threaded lower end 18 that is adapted to be threaded into a suitable aperture in the cylinder head of the associated engine (not shown) in a known manner. The nozzle port 13 is defined by a tip 19 that has a threaded portion 21 that is received in a threaded bore 22 formed at the lower end of the housing piece 17. An adjusting shim 23 is interposed between the nozzle piece 19 and housing 17 for length adjustment.

An injection valve 24 is slidably supported within a bore 25 of the nozzle piece 19 and has a reduced diameter portion 26 and a flow controlling tip 27 which, in the closed position, closes the injection nozzle port 13. The valve portion 26 has interrupted enlargements for slidably supporting the injection valve 24 in the bore 26 in a known manner.

An accumulator chamber 28 is formed above the bore 25 by the housing piece 17. The accumulator chamber 28 is closed at its upper end by means of a closure plate 29 that is held against a shoulder in the housing piece 17 by a second housing piece 31. The housing piece 31 has a threaded portion 32 that is received within a threaded bore 33 of the housing piece 17 so as to hold the closure plate 29 in position and maintain the chamber 28 in a sealed condition, except as is hereinafter noted. Externally of the threaded opening 33, the housing piece 17 is formed with a hexagonal portion 34 so as to facilitate its insertion into the threaded bore of the cylinder head.

The housing piece 31 is formed with an inlet conduit 35 that has a threaded external portion 36 so as to receive a fitting for connecting a supply line 37 extending from the pressure pump 15 to the inlet conduit 35.

The inlet conduit 35, which is generally a drilled opening, is intersected by a further drilled passageway 38 that extends axially along the housing piece 31 at one side thereof and which communicates at its lower end with a corresponding circumferential groove 39 formed in the upper face of the closure plate 29. The groove 39 is intersected by a radially extending bore 41 which, in turn, has tapped into it a metering jet 42 for delivering fuel under pressure to the accumulator chamber 28.

A control chamber 43 is formed in the closure plate 29 by means of a bore 44 that opens through the lower end of the closure plate. The injection valve 24 has a generally cylindrical actuator portion 45 that is slidably supported within the bore 44 and which closes the lower end of the control chamber 43. A restricted orifice 46 fixed in the end of the actuator portion 45 communicates an axial passage 47 of the portion 45 and radial port 48 with the passage 41. The control chamber 43 communicates with the orifice to receive the pressurized fluid and normally urge the injection valve 24 toward its downward or closed position.

A coil compression spring 49 encircles the injection valve 24 and bears against the closure plate 29 at its upper end. The lower end of the spring 49 engages a cup shaped retainer 51 that is held axially in position against a shoulder formed by an enlargement 52 on the injection valve 24 so as to further assist in maintaining the injection valve 24 in the closed position as shown in the drawings.

Figure 3:
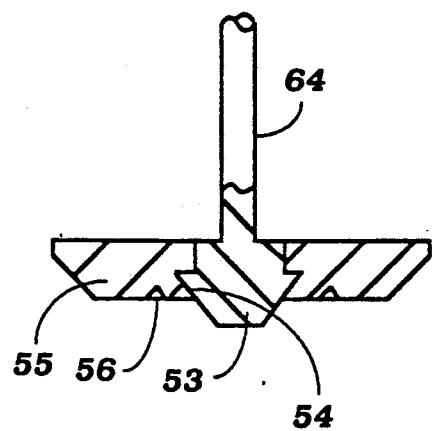
FIG. 3 is an enlarged cross-sectional view showing the relief valve.

A relief valve 53 is supported within the upper end of the closure plate 29 and controls the opening of a relief valve seat 54 fixed in the upper end of the closure plate 29 and communicating with the control chamber 43. The relief valve 53 comprises a headed portion that is received within a corresponding recess 54 formed in an enlarged disk like armature plate 55. The relief valve 53 is held in this recess 54 by upsetting a portion of the armature plate 55 around the valve 53 as shown at 56 in FIG. 3. The relief valve 53 is biased toward its closed position with the valve seat 54 in a manner to be described.

The relief valve 53 when opened will permit the fuel in the control chamber 43 to return to the tank 14 through a return fitting 57 that extends axially through the end of the housing piece 31 parallel to the inlet passageway 35. The return passageway 57 communicates with the conduit 16. Fuel can flow from the relief valve seat 54 to the return passageway 57 through suitable internal passageways or clearances to permit this return flow, which is relatively small in volume.

The relief valve 53 is opened and closed so as to control the discharge of fuel from the nozzle port 13 by means of an electromagnetic assembly, indicated generally by the reference numeral 58. This electromagnetic assembly 58 includes a generally cylindrical yoke 59 that has a threaded opening at an enlarged diameter lower end portion 61 which is received on a threaded portion of the closure plate 29 so as to secure the electromagnetic assembly 58 in position.

The electromagnetic assembly 58 is comprised of a solenoid coil or winding 62 that is disposed at the lower end of the housing or yoke 59 and which encircles an armature 63. The armature 63 is formed with a bore that slidably supports an extension 64 of the relief valve. An enlarged portion 65 is affixed to the upper end of the relief valve extension 64 and is received within a counter bore 60 formed in the upper end of the armature 63. A coil compression spring 66 is received in this counterbore and is preloaded by means of an adjustable screw 67 so as to apply a preset closing biasing force on the relief valve 53 so as to hold it in the closed position as aforenoted.

The yoke 59 of the electromagnet 58 has an upper portion 68 which is also cylindrical in shape but which is reduced in diameter from the mounting portion 61 and is of substantially lesser diameter than the bore of the housing piece 31 in which it is received. This provides a clearance 71 which, as will be noted, will prevent the transmission of stray flux paths to the housing 12.

The yoke parts 68 and 61 are connected to each other by means of an intermediate part 72 that extends radially inwardly in proximity to the lower end of the winding 62 and immediately above the armature 55 of the relief valve 53. This provides a concentrated flux path between the armature 63 of the electromagnet 58 and the armature 55 of the relief valve 53. In order to reduce the transmission of flux to the housing piece 31, the intermediate portion 72 is provided with weakened or reduced portions 73 and 74 that interconnect it to the remaining components so as to provide the aforenoted result. The lack of transmission of flux path can also be accomplished by other methods so long as the area of contact between the intermediate portion 72 and portion 68 to the mounting portion 61 is reduced.

A circuit is provided for energizing the coil 62 of the electromagnet assembly 58 for opening and closing the relief valve 53. This circuit includes a pair of terminal posts 75 that extend through the upper end of the housing piece 31 with an insulating sleeves 76 being interposed between the housing piece 31 and the terminal posts 75. Electrical tab connectors 77 are held on the posts 75 in electrical contact with them between a respective pair of nuts 78 so as to afford attachment to an appropriate lead of a circuit (not shown). A wire (not shown) is connected by a nut 79 to the post 75 to complete the connection to the winding 62.

The condition shown in FIG. 1 is that which occurs when the winding 62 is deenergized. When the winding 62 is deenergized the relief valve 51 will be held in its closed position by the spring 66 so that the accumulator chamber 28 and control chamber 43 may be pressurized.

At the appropriate instant for fuel injection to begin, which may be controlled in any suitable strategy, the winding 62 is energized. When this happens, the relief valve armature 55 will be attracted upwardly by the flux in the armature 63 so as to urge the valve portion 64 upwardly and open the relief valve 53 against the action of the spring 66. The pressure in the control chamber 43 will then be rapidly depleted and the higher pressure of the fuel acting in the accumulator chamber 28 will urge the injection valve 24 upwardly and permit fuel to issue from the nozzle port 13. When the fuel pressure in the accumulator chamber 28 has been depleted, the spring 66 will move the injection valve 24 to its closed position and the fuel pressure can then build up in the accumulator chamber 28. This action is initiated by discontinuing the energization of the winding 62 so as to close the relief valve 51 and permit pressure in the control chamber 43 to again build up.

It should be readily apparent from the foregoing description that the described fuel injection nozzle is particularly adapted in insuring against stray flux leakage and, furthermore, one that permits ease of installation into the engine and the associated fuel supply and return system. It is to be understood, however, that the foregoing description is only that of a preferred embodiment of the invention and that various changes and modifications may be made without departing from the spirit and scope of the invention, as defined by the appended claims.

I claim:

1. An accumulator type of injection nozzle comprised of an outer housing having a longitudinal axis defined by a threaded part for attachment to an engine and defining an accumulator chamber adapted to be supplied with high pressure fuel, a nozzle port leading from said accumulator chamber, an injector valve moveable between a closed position and an opened position for controlling the discharge of fuel from said accumulator chamber through said nozzle port, a control chamber for receiving pressurized fuel, an actuating member supported for movement within said control chamber and associated with said injector valve for retaining said injector valve in its closed position when said control chamber is pressurized and for movement of said injector valve to its opened when pressure is relieved in said control chamber, and relief valve means moveable between a closed position for maintaining pressure in said control chamber for effecting fuel discharge through said nozzle port, the improvement comprising a fuel inlet port in said outer housing for admitting fuel to said accumulator chamber and to said control chamber from a source and a return port for returning fuel to the source from the control chamber when said relief valve opened, both of said ports being formed in the end of said outer housing remote from the nozzle port and at least one of said ports extending in the same direction on said longitudinal axis.

2. An accumulator type of injection nozzle as set forth in claim 1 wherein both of the fuel ports are parallel.

3. An accumulator type of injection nozzle as set forth in claim 2 wherein one of the fuel ports is coaxial with the longitudinal axis.

4. An accumulator type of injection nozzle as set forth in claim 3 wherein the return port is coaxial with the longitudinal axis.

* * * * *